C. BLUME.
HAME AND TRACE CONNECTOR.
APPLICATION FILED AUG. 28, 1913.
1,126,946.
Patented Feb. 2, 1915.
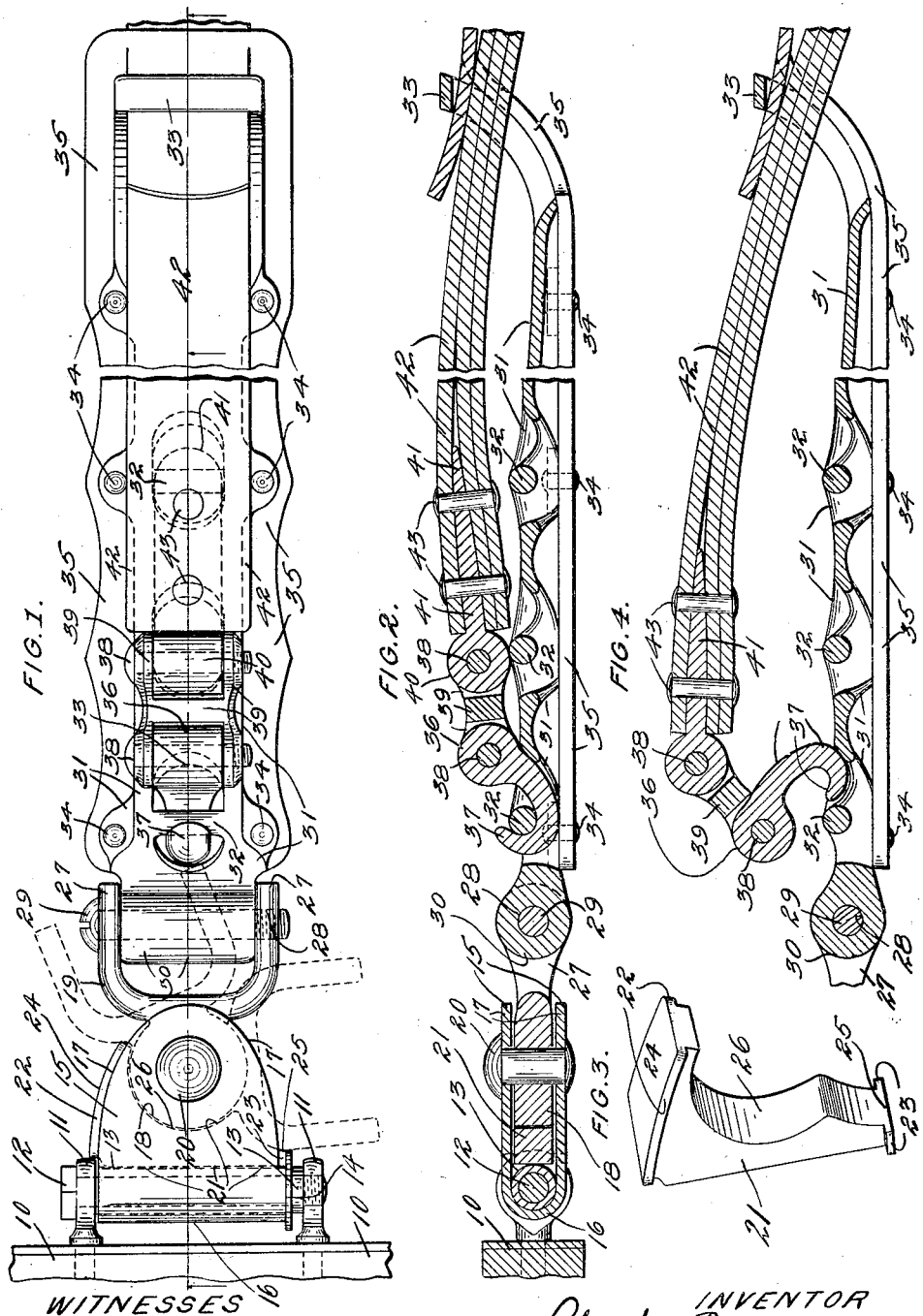
WITNESSES
Paul A. Viersen.
Iva G. Wooden.
INVENTOR
Charles Blume
BY Carl Prover ATTY

UNITED STATES PATENT OFFICE.

CHARLES BLUME, OF CHICAGO, ILLINOIS.

HAME AND TRACE CONNECTOR.

1,126,946.  Specification of Letters Patent.  Patented Feb. 2, 1915.

Application filed August 28, 1913. Serial No. 787,092.

*To all whom it may concern:*

Be it known that I, CHARLES BLUME, a citizen of the United States, residing in the city of Chicago, county of Cook, and State of Illinois, have invented a new and useful Hame and Trace Connector, of which the following is a specification.

The object of my invention is to provide a simple, strong, durable and efficient connection between hames and traces, which makes shortening and lengthening easy, prevents the clip from knuckling over sidewise, and is convenient to manufacture.

In the drawings Figure 1. is a side-elevation of my device; Fig. 2. is a longitudinal section thereof along the line 2—2 in Fig. 1.; Fig. 3 is a perspective view of a certain member constituting part of my device; and Fig. 4. is a partial longitudinal section showing the position into which sundry parts of my device are brought when it is desired to lengthen or shorten my connector.

Referring to the drawings, in hame 10 are fastened eye-bolts 11 having screw bolt 12 extending through their eyes, and threaded into the lower of said eyes, and carrying on bolt 12, between said eyes, wearing sleeve 13, preferably provided with radial flange 14. Clip 15, consisting of a plate doubled upon itself, embraces with its loop portion 16 wearing sleeve 13 above radial flange 14, and forms two parallel ears 17 between which the head 18 of clevis 19 is secured by horizontal rivet 20 so as to be oscillatable upon it. Between ears 17, sleeve 13 and head 18 is inserted member 21, having, preferably, projections 22 and 23 overlapping the upper and lower edges respectively, of ears 17. The upper end 24 of member 21 is made wide enough (from front to rear) to prevent any considerable oscillation of clevis 19 upward, while its lower end 25 is made narrow enough (from front to rear) to permit oscillation of clevis 19 downward until it hangs almost, vertically downward. The limits to which the movement of clevis 19 is thus confined, are indicated by its extreme positions shown in dotted outline in Fig. 1. The front edge of member 21 is preferably made straight and adjoins sleeve 13, while the middle of the rear edge of member 21 is preferably provided with curved recess 26 adapted to receive, and snugly fit, head 18. It is obvious that by this arrangement member 21 serves to hold loop portion 16 along its whole length close to sleeve 13. The rear end of clevis 19 is formed with horizontal projections 27, provided with eyes 28, the lower one of which is preferably screwthreaded, for the reception of screw bolt 29 upon which there is mounted, between projections 27, perforated head 30, integrally and rigidly attached to metal hame tug 31 which is provided with a series of crossbars 32 and a loop 33, and to which is attached, by rivets 34, leather safe 35 to prevent direct contact with the body of the draft animal. The perforated head 36 of a trace hook 37, adapted to engage any one of crossbars 32, is connected preferably by a double joint, formed by vertical rivets 38 and connecting member 39, with perforated head 40 of a tongue 41 to which trace 42, extending through loop 33, is attached by rivets 43.

It will be plain, without further details, to anybody familiar with hame and trace connectors that my connector makes it possible, as shown in Fig. 4, to lengthen or shorten it without any bending of trace 42. This is impossible where tracehook 37 is rigidly attached to tongue 41, or where buckles are used. It will furthermore readily be understood that by preventing upward oscillation of clevis 19, as above described, I make it impossible for hame tug 31 to knuckle over sidewise at its front end when trace 42 is thrown over the back of the draft animal—which knuckling over often causes well known trouble when the trace is reconnected, especially when this is done in a hurry or in the dark. On the other hand, when a harness fitted up with my device is hung up when out of use, the freedom provided for clevis 19 to oscillate downward almost to a vertical position, enables trace 42 to hang practically straight down, thereby relieving it of harmful bending strain. All the parts of my device may readily be made the same for use right and left, thereby avoiding the necessity of duplication of patterns and dies. Projections 22 and 23 assist in making clip 15 rigid, while projections 22 have the additional function of keeping out dirt, and giving a good appearance.

One of the principal advantages of my device rests in the direct metallic connection between the clevis and the metal hame tug. Heretofore the connection between these members has always been made of leather. A leather connection of this kind is very expensive both by reason of the material required and the large amount of hand labor involved. My direct metallic connection can be made at about one-eighth of the cost of the leather connection.

I claim:—

In a hame and trace connector, the combination of a metallic hame tug suitably connected with a hame staple and having a series of crossbars; a trace; a tracehook; and a link connecting the trace and the hook whereby a double joint is formed between the trace and the hook; for the purpose described.

CHARLES BLUME.

Witnesses:
CARL STROVER,
LEA KRANSZ.

Copies of this patent may be obtained for five cents each, by addressing the "Commissioner of Patents, Washington, D. C."